C. CHRISTENSEN.
COMBINED MILK COOLER AND STRAINER
APPLICATION FILED JAN. 23, 1914.
1,114,964.
Patented Oct. 27, 1914.
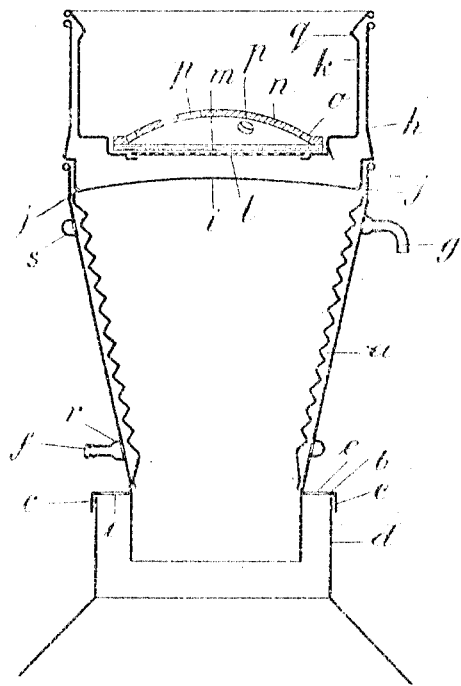
Witnesses:
Inventor:
Carl Christensen
By Attorneys,

UNITED STATES PATENT OFFICE.

CARL CHRISTENSEN, OF CHARLOTTENLUND, NEAR COPENHAGEN, DENMARK.

COMBINED MILK COOLER AND STRAINER.

1,114,964. Specification of Letters Patent. Patented Oct. 27, 1914.

Application filed January 28, 1914. Serial No. 814,905.

*To all whom it may concern:*

Be it known that I, CARL CHRISTENSEN, subject of the King of Denmark, residing at Charlottenlund, near Copenhagen, Denmark, 14 Foraarsvej, have invented new and useful Improvements in Combined Milk Coolers and Strainers, of which the following is a specification.

The invention relates to a milk-cooler of the kind by which the milk is supplied in fine jets down on the corrugated cooling surface of a water-jacket.

The apparatus constructed according to this invention distinguishes itself from the known apparatuses of this type by being adapted to be placed directly on top of an ordinary transport bucket, there being required no kind of supporting base or suspending device, and by being able to strain the milk as well as to cool it, the apparatus being fitted with a strainer of special construction. By means of this arrangement the necessary filtration is thus effected simultaneously with the highly desirable cooling immediately after the milking.

One manner of execution of the apparatus is shown, in vertical section, on the drawing.

The water jacket $a$, shaped as an inverted truncated cone, is smooth on the outside but corrugated on the inside and has, at bottom, a collar $b$ with downwardly bent edge $c$, adapted to fit around the neck $d$ of the transport bucket. In the collar $b$ one or more holes $e$ are provided by way of which the level of the milk in the transport vessel may be observed. The water-jacket has at bottom a hose nipple $f$ for the entering cooling water and, at top, a discharge-spout $g$. The upper edge of the water-jacket supports an attachment $h$ whose bottom $i$ bulges upward and has, at its circumference, a number of outwardly sloping fine holes $j$. The attachment $h$ in its turn supports a straining vessel $k$ whose bottom is depressed in two steps toward a circular opening at the center. On the bottom most of the two thus produced rabbets rests a detachable frame with wire netting $l$, supporting a disk $m$ of cotton wool. The cotton wool is kept in position by a heavy plate $n$, fitting loosely in the upper rabbet of the bottom of the strainer. Only the edge of the plate $n$ rests on the cotton wool, and near this edge there are outlets $o$ for the milk, the central portion of the plate being domed upward and having here three finger-holes $p$, so that the plate may easily be taken up and placed in position. The inside bead $q$ shown at top of the strainer serves in known manner to prevent waste by the milk splashing out when it is being emptied into the strainer. By the here described arrangement of the apparatus, it is attained that all the parts of the apparatus, and there are but a few, are easy to produce and, consequently cheap, and they are also easy to clean while the apparatus, notwithstanding its cheapness, is handy and reliable to use.

In order to effect a better distribution of the cooling water there may be provided on the cooling mantle, in connection with the inlet and outlet-tubes $f$ and $g$, annular hollow beads $r$ and $s$ whose cavity communicates with the water space by way of fine holes, distributed along the entire circumference.

Having now particularly described and ascertained the nature of my said invention and in what manner the same is to be performed, I declare that what I claim is:—

1. In a milk cooler the combination with a conical double walled cooling jacket adapted to fit upon the top of a transport receptacle, means for supplying cooling fluid to the space between said walls, a strainer carried by the top of said conical cooling jacket and having perforations located in position for spraying milk against the inner of the said walls, and means located above said closed bottom for straining milk.

2. A device of the character specified, the combination with a double walled conical structure, means for supplying a cooling fluid to the space between said walls, the inner of said walls being corrugated, a distributer for distributing the milk to said corrugated inner wall, and a strainer located above said distributer and adapted for removal therefrom.

3. A milk cooler comprising a strainer, a distributer and a cooling device, the cooling device being adapted for resting upon the top of a transport receptacle and flaring outwardly from the bottom and means for cooling the walls thereof, the distributer being separable from the cooling device and having a closed bottom arched upwardly in the center and provided with openings for spraying the milk against said cooling walls, the strainer being separable from and adapted to be supported by the distributing device and having a perforated bottom, straining material located on such perforated bottom and a heavy upwardly arched plate having its edges constructed and adapted for resting upon the edges of the straining material and provided with openings adjacent said edges for the passage of the milk.

4. In a milk cooler, the combination with a cooling device having an interior conical milk receiving surface, a distributer adapted to detachably fit the upper portion of said cooling device and direct the milk upon the said milk receiving surface thereof, and a strainer adapted to be detachably carried by the distributer.

5. In a device of the character specified, the combination with a straining vessel having at its bottom a rabbeted depression, a perforated plate resting upon a rabbet of such bottom, a disk of straining material located above the said plate and disposed in another of said rabbets, and an upwardly arched heavy plate having its edges resting upon the edges of the straining material and being provided with holes inwardly of said edges for the passage of the milk.

In witness whereof, I have hereunto signed my name in the presence of two subscribing witnesses.

CARL CHRISTENSEN.

Witnesses:
CARL FOX MAUTE,
JULIUS LEHMANN.